Patented Jan. 8, 1946

2,392,359

UNITED STATES PATENT OFFICE 2,392,359

CARBOHYDRATE DERIVATIVES

Joseph N. Borglin, Wilmington, Del., assignor to Hercules Powder Company, Wilmington, Del., a corporation of Delaware No Drawing. Application March 8, 1944, Serial No. 525,599

21 Claims. (Cl. 167—33)

This invention relates to a new series of carbohydrate derivatives and a method for their preparation and more particularly to a new series of compounds having the type formula $$\{C_6H_7O_2[OOCRX(CN)]_n(OH)_{3-n}\}_x$$

in which R is a hydrocarbon radical, X is a chalcogen (an element of the group oxygen sulfur, selenium and tellurium) having an atomic weight greater than 32, $n$ is a number not greater than 3, and $x$ is a whole number large enough that the corresponding carbohydrate is soluble in water.

In accordance with this invention, solid thio-, seleno-, or telluro-cyanoacyl esters of complex carbohydrates, such as starch and cellulose, have been prepared. The complex carbohydrate is first reacted with a halogen-substituted acylating compound, such as a halogen-substituted acyl halide, a halogen-substituted acid anhydride, or a halogen-substituted carboxylic acid to form a haloacyl ester of the complex carbohydrate. This ester is separated from the reaction mixture and treated with a salt of thiocyanate, selenocyanate, or tellurocyanate. An ester of a polysaccharide with a thio-, seleno-, or telluro-cyano-substituted carboxylic acid is formed.

The process for the production of the carbohydrate derivatives in accordance with this invention is illustrated by the following examples, the parts and percentages being by weight.

EXAMPLE 1

*Thiocyanoacetate of starch*

Eighty-five parts corn starch having a fluidity of 90, (determined by the standard method), 236 parts chloroacetic acid and 50 parts benzene were placed in a still having an azeotropic refluxing attachment that returns only benzene from the reflux and eliminates the water formed in the course of the reaction. The mixture was refluxed for 15 hours by heating the still in an oil-bath maintained at 93° C. to 106° C. About 28 parts of water was separated from the reaction mixture. The thin pasty reaction mixture was washed with water four times and the hardened substance obtained was ground in water. The light brown sandy product was then washed until almost neutral and dried at 60° C. to 70° C. One hundred forty-eight parts of a product containing 21% chlorine was obtained. (The calculated percentage of chlorine in a starch derivative having two chloroacetyl groups per glucose unit is 22.5%.)

One hundred forty-five parts of the above chloroacetate of starch, 100 parts sodium thiocyanate, and a mixture of 50 parts 95% alcohol and 75 parts acetone were refluxed for two hours. The reaction mixture was diluted with 800 parts ethyl acetate. Part of the product went into solution and was separated by filtration from the precipitate. The solution was washed four times with water containing some sodium sulfate to break up the emulsion. After distilling off the solvent, 144 parts of a brown semisolid substance was obtained. Analysis showed that this product contained 14.5% sulfur. The precipitate was dissolved in acetone and reprecipitated with water. After washing and drying, 51.9 parts of soft, crumby, brown material was obtained. By analysis, it was determined that this product contained 13.6% sulfur.

EXAMPLE 2

*Thiocyanoacetate of cellulose*

Sixty parts cotton linters of 83 seconds viscosity, (determined by the standard method), and 190 parts chloroacetic anhydride were kneaded in a Baker-Perkins mixer. Another 190 parts chloroacetic anhydride, which was melted in a separate container and mixed with 1.8 parts concentrated sulfuric acid, was also introduced into the Baker-Perkins mixer. This mixture was agitated for 5 to 6 hours at 60° C. to 65° C. Seven hundred to 800 parts of water was then stirred into the dark paste to precipitate the product, which was then filtered and washed. The product was dried at 65° C. to 70° C. One hundred twelve parts of almost white powder was recovered. This product contained 24.9% chlorine. (Cellulose bischloroacetate contains 22.5% chlorine.)

One hundred sixty-seven parts cellulose chloroacetate prepared by the above method was mixed with 320 parts acetone and 120 parts sodium thiocyanate. The mixture was refluxed for 2.5 to 3 hours. The reaction mixture was diluted with 1600 parts ethyl acetate and washed four times with water using about 500 parts water each time. After distilling off the solvent 159 parts of dark soft product was obtained. This product contained 17.9% sulfur. (Cellulose bisthiocyanoacetate contains 17.8% sulfur.)

EXAMPLE 3

*Thiocyanobutyrate of starch*

Seventy-five parts corn starch having a fluidity of 90, (determined by the standard method), and 135 parts alpha-chlorobutyric anhydride were kneaded in a Baker-Perkins mixer. Another 135 parts alpha-chlorobutyric anhydride, which was melted and mixed with 1.8 parts of concentrated sulfuric acid, was also added to the mixture. This mixture was agitated for 8 hours at 75° C. The product was washed with water until almost neutral and dried at 65–70° C. One hundred-thirty parts of an almost white product was obtained.

One hundred-twenty parts of the starch chlorobutyrate, 100 parts of potassium thiocyanate, and 250 parts of acetone were refluxed for 2 hours. The reaction mixture was diluted with 1000 parts of ethyl acetate and washed 4 times with water containing some sodium sulfate. After distilling off the solvent, 122 parts of a dark soft product containing 13% sulfur was obtained. (The calculated percentage of sulfur is a starch derivative having two thiocyanobutyryl groups per glucose unit is 15.4%.)

In accordance with the present invention, solid derivatives of complex carbohydrates have been prepared. These derivatives have the general formula $\{C_6H_7O_2[OOCR'X(CN)]_n(OH)_{3-n}\}_x$, in which R' represents the hydrocarbon radical of a carboxylic acid, preferably an aliphatic or an aromatic hydrocarbon radical, X is a chalcogen having an atomic weight of at least 32, i. e., sulfur, selenium, or tellurium, $n$ is a positive number not greater than three, and $x$ is a positive integer. The value of $x$ is not known with certainty but it must be large enough so that the corresponding carbohydrate does not form a true solution in water. The compounds may be thiocyanates or isothiocyanates.

By complex carbohydrates is meant polysaccharides having a complex structure and represented by the formula $(C_6H_{10}O_5)_x$, in which the number of saccharide units, $x$, is not known with certainty. These carbohydrates are amorphous, do not form true solutions in water, and are not sweet. For example, starches, such as corn starch, potato starch, rice starch, cassava starch, etc., cellulose, such as cellulose linters, wood pulp, etc., glycogen, dextrins, inulin, etc., may be used. Of these compounds, starch and cellulose have been found most suitable.

The esterifying agents which can be used to prepare the halogen-substituted esters are the halogen-substituted carboxylic acids, and the corresponding anhydrides and acid halides. For example, the acids which may be used include the aliphatic acids, such as chloroacetic acid, alpha-chloropropionic acid, beta-chloropropionic acid, alpha-chlorobutyric acid, beta-chlorobutyric acid, gamma-chlorobutyric acid, beta-chloroisobutyric, alpha-chloropalmitic acid, alpha-chlorostearic acid, chloromalonic acid, chlorosuccinic acid, and the aromatic acids, such as o-chlorobenzoic acid, m-chlorobenzoic acid, p-chlorobenzoic acid, chlorophthalic acid, etc. In place of the acids, the corresponding anhydrides, such as chloroacetic anhydride, alpha-chloropropionic anhydride, beta-chloropropionic anhydride, the various chlorobutyric anhydrides, etc., may be used. The corresponding acid chlorides or bromides, such as chloroacetyl chloride, chloroacetyl bromide, alpha-chloropropionyl chloride, the various chlorobutyric chlorides, etc., may also be used as esterifying agents. When using acid halides it is preferable to include in the reaction mixture an acid acceptor, for example, pyridine or similar amines, to take up the hydrogen halide formed in the reaction. In addition to the chloro-substituted esterifying agents, the bromo- and iodo-substituted agents may also be used.

The reaction between the carbohydrate and the esterifying agent may be brought about either with or without the catalyst. Suitable catalysts are esterification catalysts, such as sulfuric, p-toluene sulfonic, benzenesulfonic, methionic, phosphoric, perchloric acids, etc.

The halogen-substituted esters are prepared by reacting the complex carbohydrates with the esterification agent at a temperature between about 20° C. and about 200° C., preferably between about 50° C. and about 150° C., until the reaction is substantially complete. If desired, inert solvents, such as benzene, toluene, xylene, cymene, chloroform, carbon tetrachloride, trichloroethylene, methyl chloride, tetrachloroethane, etc., may be present. When a solvent is used it will be convenient to carry out the reaction at the boiling point of the reaction mixture under reflux conditions, thereby utilizing the solvent to maintain temperature at the desired level. The inert solvents which are immiscible with water, such as toluene, benzene, and the like, may be utilized to provide a means for azeotropic distillation to remove water when it is formed by the reaction.

The time required to provide at least partial completion of the esterification will depend upon the catalyst, nature of the reactants, temperature, solvent, concentration of the catalyst, etc. Thus, the time of reaction may vary from a few minutes to a few days, preferably from 1 hour to 24 hours.

After completion of the reaction, the ester of the polysaccharide with the haloacid will be separated from the reaction mixture by dissolving the latter in a suitable solvent, such as ether or ethyl acetate, washing the solution with water to remove the excess acid and the catalyst and then distilling off the solvent. The specific properties of the haloacyl esters will depend on the particular carbohydrate and the particular esterifying agent used in their production and the degree of esterification, i. e., the number of hydroxyl groups actually esterified. For example, starch and cellulose which contain three hydroxyl groups per glucose unit, may be esterified to varying extents so that mono-, di-, and tri-esters are formed. It is possible that separate glucose units within one molecule may be esterified to different extents so that compounds intermediate between the mono- and di-esters or between the di- and tri-esters may be formed. The extent of esterification depends upon the molecular ratio of the reactants and the reaction conditions.

The second step in preparing the thiocyanoacyl derivatives of the polysaccharide consists in converting the haloacyl esters, obtained by the process described above, to the corresponding thiocyanoacyl esters by treatment with a suitable inorganic thiocyanate. An inorganic thiocyanate, to be reactive under the conditions employed, must be partially or completely soluble in the reaction mixture utilized. For example, suitable thiocyanates include sodium, potassium, lithium, ammonium, calcium, and magnesium thiocyanates. In order to make seleno- or tellurocyanoacyl esters of polysaccharides, the corresponding seleno- or telluro-cyanates are used in place of the above thiocyanates. The isocyanates are prepared by heating the corresponding cyanates.

The relative proportions of the metal thiocyanate and the haloacyl esters will depend upon the relative molecular weights and the number of halogen atoms to be replaced by the thiocyanate group. In order to obtain the highest yield of thiocyanoacyl ester, it is necessary to apply an appreciable excess of the inorganic thiocyanate over the theoretical required amount. This excess may vary from about 10% to about 100%, preferably from about 20% to about 50%.

The conversion of the chloro-substituted esters into the thiocyano-substituted esters is preferably carried out in an inert solvent, such as, the lower aliphatic alcohols, e. g., methanol, ethanol, isopropanol, etc., or other inert solvents, e. g., acetone, dioxane or a mixture of an alcohol with acetone, etc. The reaction temperature may vary from about 40° C. to about 150° C., preferably from about 60° C. to about 100° C. It is preferred to carry out the reaction by heating the reaction mixture at reflux temperature for a period of time varying from about 0.25 hour to about 5 hours, preferably from about 0.5 hour to about 2 hours. After the reaction is complete the product is dissolved in a suitable solvent, such as ethyl acetate and ether, and the solution washed with water to eliminate the by-products or excess reagent. The solvents are then removed by distillation.

The thiocyanoacyl esters produced according to this invention are solid substances. Their physical properties will depend on the particular carbohydrate and esterifying agent used as starting materials. The physical properties will also depend upon the degree of esterification, i. e., the number of hydroxyl groups substituted by thiocyanoacyl groups. In other words, the properties will depend on whether a mono-, di-, or tri-ester of carbohydrate has been formed.

The products prepared in accordance with this invention have been found useful for killing larvae, such as the common house fly maggot and moth larvae. The insecticide is prepared by mixing compounds having the formula $\{C_6H_7O_2[OOCRX(CN)]_n(OH)_{3-n}\}_x$ with a carrier. For example, the thiocyanoacyl esters of complex carbohydrates may be absorbed on the surface of an inert powder, such as a 1:1 mixture of pyrophyllite and fuller's earth.

The products formed in accordance with this invention are useful as insecticides, especially for horticultural uses and for mothproofing agents, particularly the impregnation of textiles. The products are not volatile and, therefore, their effect is more permanent than low molecular weight insecticides.

What I claim and desire to protect by Letters Patent is:

1. A compound having the type formula $\{C_6H_7O_2[OOCRX(CN)]_n(OH)_{3-n}\}_x$ in which R is a hydrocarbon radical, X is a chalcogen having an atomic weight greater than 32, $n$ is a number not greater than 3, and $x$ is a positive number sufficiently large that the carbohydrate is insoluble in water.

2. A compound having the type formula $[C_6H_7O_2(OOCRSCN)_n(OH)_{3-n}]_x$ in which R is a hydrocarbon radical, $n$ is a number not greater than 3, and $x$ is a positive number sufficiently large that the carbohydrate is insoluble in water.

3. A thiocyanoacyl ester of starch.
4. A thiocyanoacetate of starch.
5. A thiocyanoacyl ester of cellulose.
6. A thiocyanoacetate of cellulose.
7. A process for the production of the product of claim 1 which comprises reacting a complex carbohydrate with a halogen-substituted esterifying agent selected from the group consisting of a halogen-substituted acyl halide, a halogen-substituted acid anhydride, and a halogen-substituted carboxylic acid, and reacting the resulting ester with a salt selected from the group consisting of a metal thiocyanate, a metal selenocyanate, and a metal tellurocyanate.

8. A process for the production of the product of claim 2 which comprises reacting a complex carbohydrate with a halogen-substituted esterifying agent selected from the group consisting of a halogen-substituted acyl halide, a halogen-substituted acid anhydride, and a halogen-substituted carboxylic acid in the presence of an esterification catalyst, and reacting the resulting ester with a metal thiocyanate at a temperature between about 40° C. and about 150° C.

9. A process for the production of a thiocyanoacylate of a complex carbohydrate which comprises reacting the said carbohydrate with a halogen-substituted esterifying agent selected from the group consisting of a halogen-substituted acyl halide, a halogen-substituted acid anhydride, and a halogen-substituted carboxylic acid in the presence of sulfuric acid, and reacting the resulting ester with a metal thiocyanate at a temperature between about 40° C. and about 150° C.

10. A process for the production of a thiocyanoacetate of a complex carbohydrate which comprises reacting the said carbohydrate with chloroacetic anhydride in the presence of sulfuric acid, separating the resulting ester, and reacting the ester with a metal thiocyanate at a temperature between about 40° C. and about 150° C.

11. A process for the production of cellulose thiocyanoacetate which comprises reacting cellulose with chloroacetic anhydride in the presence of sulfuric acid, separating the resulting ester, and reacting the ester with sodium thiocyanate at a temperature between about 40° C. and about 150° C.

12. A process for the production of a thiocyanoacylate of a complex carbohydrate which comprises reacting the said carbohydrate with a halogen-substituted esterifying agent selected from the group consisting of a halogen-substituted acyl halide, a halogen-substituted acid anhydride, and a halogen-substituted carboxylic acid in the presence of an inert solvent and reacting the resulting ester with a metal thiocyanate at a temperature between about 40° C. and about 150° C.

13. A process for the production of a thiocyanoacylate of starch which comprises reacting starch with a halogen-substituted carboxylic acid in the presence of an inert solvent which is immiscible with water, and subjecting the mixture to azeotropic distillation, separating the resulting ester, and reacting said ester with an alkali metal thiocyanate at a temperature between about 40° C. and about 150° C.

14. A process for the production of starch thiocyanoacetate which comprises reacting starch with chloroacetic acid in the presence of benzene, separating the resulting ester, and reacting the ester with a sodium thiocyanate at a temperature between about 40° C. and about 150° C.

15. An insecticidal composition containing as a toxic ingredient the product of claim 1 and a carrier.

16. An insecticidal composition containing as a toxic ingredient a thiocyanoacetate of cellulose and an inert powder.

17. An insecticidal composition comprising a thiocyanoacetate of starch and an inert powder.

18. An insecticidal composition comprising a thiocyanoacetate of cellulose and a mixture of pyrophyllite and fuller's earth.

19. An insecticidal composition comprising thiocyanoacetate of starch and a mixture of pyrophyllite and fuller's earth.

20. A process for the production of a haloacylate of starch which comprises reacting starch with a halogen-substituted carboxylic acid in the presence of an inert solvent which is immiscible with water, and subjecting the reaction mixture to azeotropic distillation.

21. A process for the production of a chloroacetate of starch which comprises reacting starch with chloroacetic acid in the presence of benzene and subjecting the reaction mixture to azeotropic distillation.

JOSEPH N. BORGLIN.